United States Patent Office 3,445,982
Patented May 27, 1969

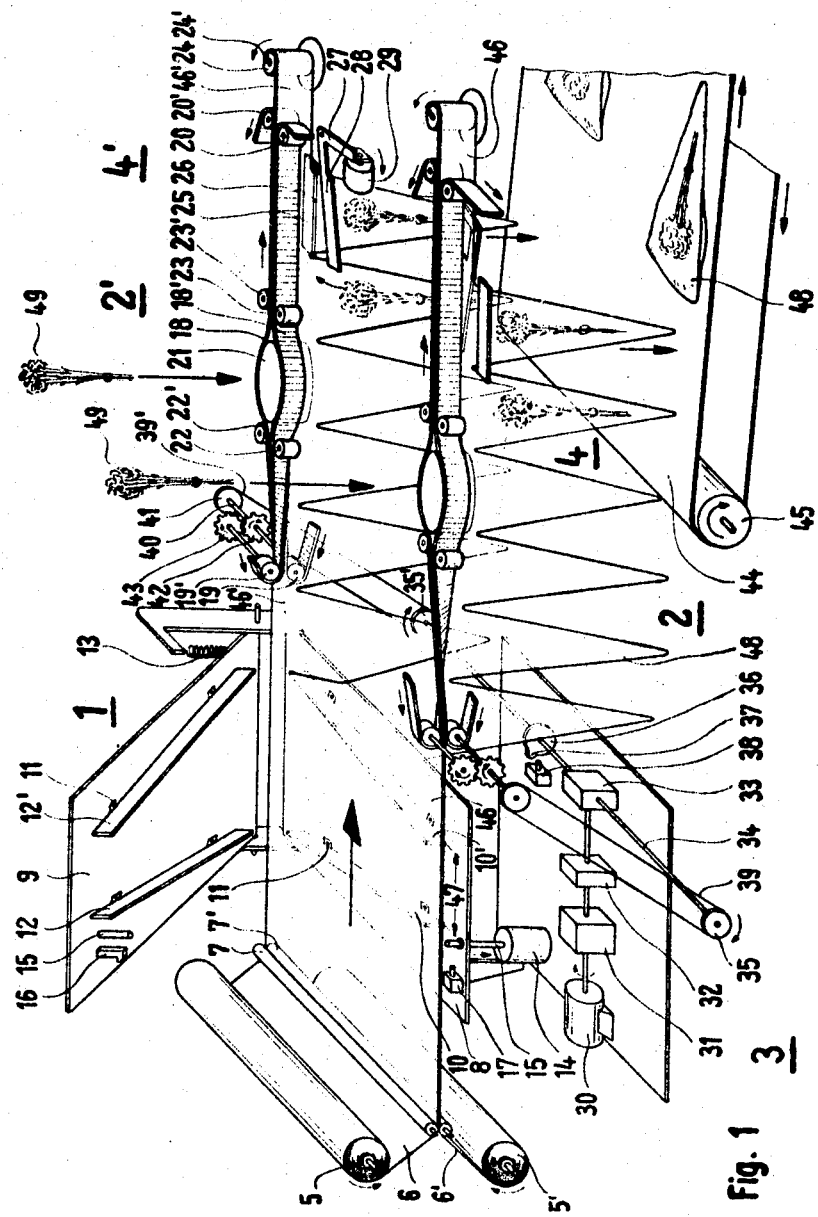

3,445,982
PROCESS AND APPARATUS FOR THE PACKAGING OF PLANTS
Armin Schweikert, Waidweg 1, Karlsruhe, Germany
Filed Jan. 11, 1968, Ser. No. 697,057
Claims priority, application Germany, Jan. 20, 1967, Sch 40,114
Int. Cl. B65b 43/06, 5/02
U.S. Cl. 53—29
20 Claims

ABSTRACT OF THE DISCLOSURE

A process and apparatus for the packaging of cut flowers, potted plants, and other goods in bags of thermoplastic films of a synthetic material, the bags being successively manufactured with the films being moved stepwise in subsequent operating steps interrupted by rest periods, from two equally wide films placed upon each other horizontally, by providing welding seams extending at right angles to the travel direction of the films, wherein during the welding step a severing step is conducted along the center of the seam to form two strips of open bags; then, the bags are opened for the introduction of the cut flowers, potted plants and other goods, and thereafter sealed shut.

BACKGROUND OF THE INVENTION

In recent times, large-scale nurseries have in many cases grown in the open field cultures and in the green houses implemented the procedure of assembling the flowers into bouquets ready for sale, tying them and delivering them to sales companies, self-service stores, and companies operating mechanical sales devices. For this purpose, it is necessary to package the bouquets already in the nursery individually into suitable bags and seal these bags so that they are moisture-proof for the purpose of keeping the flowers fresh. With respect to the packaging of the plants, which are very sensitive against pressure, and the subsequent sealing of the bags, the nurseries previously had to rely exclusively upon the time-consuming and expensive manual work. Large nurseries cutting and delivering daily many thousands of flowers are often incapable, due to the lack of personnel, to conduct the intended and required individual packaging of the flowers within a proper period of time after cutting, so that losses on account of too long a storage time of the cut flowers are unavoidable.

It is conventional to package cut flowers and potted plants into V-shaped or U-shaped bags of transparent plastic foils. These bags are produced from two equally wide films placed one on top of the other, which films are pulled stepwise across a welding unit. By means of welding bars corresponding to the width of the films, on the top edge of which bars an electrical heating wire is arranged, the two films are welded together in the transverse direction in certain places and simultaneously severed. The finished bags are superimposed in quantities of 50 or 100, compressed, and prepared for being transported to the nurseries. For packaging the plants, each bag must first be opened and spread apart in the nursery. This opening procedure is difficult and very cumbersome, since the thin films in almost all cases adhere strongly to one another. Furthermore, if the filled bag is closed merely by folding over the upper edge, there is hardly any assurance that the packaged cut flowers will keep fresh. In some companies, the bags are therefore welded together. However, during the welding of the rim of the bag, errors often occur since the marginal zones of the bag walls can be introduced into the welding device only under difficulties in such an even manner that a flawless and tight welding action can be accomplished. It is also known, for closing the bags, to roll, by hand, a wire glued in between two paper strips into the rim of the bag and to bend over the ends of this wire which project on both sides. However, when employing this manner of sealing, the flowers or plants contained in the bag are easily squeezed, and a gentle treatment is not ensured.

SUMMARY OF THE INVENTION

The purpose of this invention is to facilitate and accelerate the packaging of, in particular, individual or bunched cut flowers, as well as potted plants with or without the pot within the scope of operation of large nurseries.

The invention provides a process for packaging cut flowers and potted plants, as well as other goods, particularly bulb goods, into bags of thermoplastic films, wherein the bags are successively manufactured with the films being moved stepwise in subsequent manufacturing steps interrupted by rest periods, from two equally wide films superimposed upon each horizontally, by providing welding seams extending at right angles to the travel direction of the films, a severing step being conducted during the welding step along the center of the seam; and wherein the bags are then opened for the introduction of the cut flowers, potted plants, and other goods, and are then sealed.

This problem is solved, in accordance with the invention, by placing the welding seams in the center of the films, leaving two equally wide marginal strips, so that two separate film bands are produced each having a continuous series of bags commencing at the marginal strips and being in connection with one another by way of these marginal strips, in this connection, the magnitude of one step of the advancing movement corresponding in each case to the connecting distance between the marginal strip and the bag; by thereafter pivoting the marginal strips during the further movement by twisting through an angle of 90° from the horizontal in the upward direction, and pivoting the bags downwardly by an angle of 90°, in each case about the connecting path; by subsequently separating the films forming each of the two marginal strips across the width of a bag and then combining same again, for the purpose of introducing cut flowers, potted plants, and other goods into the bags; and, finally, by welding the films of each film band together by respectively one welding seam along the connecting paths within the rest period, in order to seal the bags, the welding seam being simultaneously severed so that the bags fall away from the marginal strips.

In an advantageous further development of the process of this invention, the marginal strips, after the bags have fallen away, are wound up so that they do not interfere with the manufacturing process.

By means of the suggested process, individual cut flowers or bouquets, as well as potted plants and other materials can be packaged so as to be moisture-proof in an economical and gentle manner.

The apparatus for conducting the process consists of a welding unit with welding bars mounted on a table, the films being guided horizontally over these bars, with pressure bars pivotably provided above the table; two conveyor units serving for the stepwise advancement of the films and having respectively two endless conveyor belts driven by respectively two drive rolls arranged in pairs one beside the other, the films being guided between these belts; as well as a cutting device having two welding bars and two pressure bars pertaining thereto. The apparatus is characterized, in accordance with the invention, by the fact that the welding bars are positioned with their front faces on both sides at the same distance from the margins of the films guided over the table; that the belt conveyors are positioned horizontally and in a side-by-side arrangement and their mutual spacing corresponds to the width of the films, the marginal strips of these films being engaged by these belts in the region of the table; that the conveyor belts are made of an elastic material; that the drive rolls are adjacent to the table and their axes are superimposed horizontally and vertically; that the conveying parts of the conveyor belts lead away from the table, are guided approximately in parallel, are in contact with each other with their inner sides, and are twisted in themselves behind the drive rolls by an angle of 90°, the inner edges extending in a straight line; that respectively one hollow filling cylinder is provided between the conveying parts of the conveyor belts, the axis of this cylinder being vertically positioned; that in front of and behind each filling cylinder, front guide rolls and rear guide rolls are provided which are arranged in pairs, having axes vertical with respect to one another, the conveying parts extending between these rolls, these rolls guiding the conveyor belts entraining with their inner sides the marginal strips of the films on both sides around the filling cylinder; that the welding bars of the cutting devices are positioned behind the rear guide rolls and at a small spacing beneath the conveying parts, and the pressure bars pertaining thereto are provided to be horizontally pivotable.

In a preferred embodiment of the apparatus, a reel-up drum is arranged behind each belt conveyor, which drum is driven by way of a slipping clutch and is vertically positioned, and serves for winding up the marginal strips.

In order to ensure an accurately specified advancement of the films, the conveyor belts are advantageously provided with serrated ribs on their outsides, and the drive rolls are equipped with grooves corresponding to the serrated ribs to provide a toothed interengagement, positive drive.

Suitably, the filling cylinder is of an elliptical cross section. This facilitates the guidance of the conveying parts of the two conveyor belts around this cylinder.

In order to keep the amount of friction between the filling cylinder and the marginal strips of the films, guided therearound by the conveying parts of the two conveyor belts, small, and to minimize wear and tear, the outside of the filling cylinder can be hard chrome-plated. A layer of silicone rubber accomplishes the same purpose in a particularly advantageous manner.

In order to further convey the filled and sealed bags to a shipping table where the bags are packed into cartons, a conveying cloth is arranged underneath the severing devices, the severed bags falling upon this cloth.

In a preferred embodiment of the apparatus, the front guide rolls and the rear guide rolls are provided to be horizontally pivotable and are pressed against each other in pairs by means of springs. For this purpose, the guide rolls can be mounted, for example, to pivot arms which are pulled toward each other by the springs. The tension can be adjustable. In this manner, the guide rolls compress the conveying parts before and behind the filling cylinder, so that a secure guidance of the marginal strips of the film bands in the region of the filling cylinders is ensured.

Advantageously, the spacing between the conveying parts of the conveying belts of the two belt conveyors increases slightly behind the drive rolls in the direction toward the front guide rolls. This has the effect that the two film bands are separated from each other with certainty.

BRIEF DESCRIPTION OF THE DRAWING

With reference to the drawing, an embodiment of the apparatus of this invention, as well as the novel process, are explained in greater detail. In the drawings:

FIGURE 1 shows the apparatus for conducting the process, but without the parts of the frame structure, in a perspective view with cavalier projection.

DETAILED DESCRIPTION OF THE DRAWING

Figure 3:
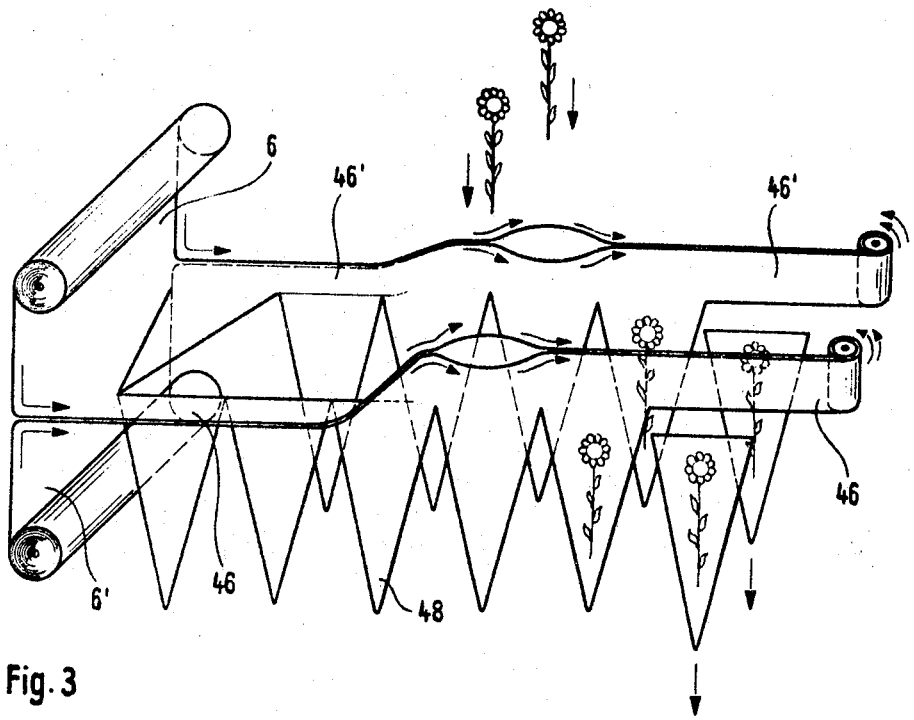
FIGURE 3 is an illustration of the process in a perspective view with cavalier projection.

The apparatus, wherein the conventionally constructed frame structure is not illustrated for reasons of clarifying the drawing, comprises a welding unit 1, two belt conveyors 2 and 2', a drive assembly 3, and two cutting devices 4 and 4'.

Two storage rolls 5 and 5' are provided one above the other in front of the welding unit 1, in a horizontal direction; heat-sealable thermoplastic transparent films 6 and 6', made, for example, of polypropylene, are wound up thereon. Two guiding rollers 7 and 7' are positioned at a small spacing from each other between the storage rolls 5 and 5', the two equally wide films 6 and 6' being guided through the slot produced thereby.

The welding unit 1 consists of a table 8 and a plate 9 pivotably disposed above the table 8. The two films 6 and 6' are positioned above the table 8. At right angles to the films 6 and 6', two equally long welding bars 10 and 10' are provided on the upper surface of the table 8; along the upper edge of these welding bars, an electrical heating wire is attached. The welding bars 10 and 10' are threadedly connected to the table 8 by means of mounting angle brackets 11. On the underside of the plate 9, two pressure bars 12 and 12', congruent with the welding bars 10 and 10', respectively, are mounted, likewise with the aid of angle brackets 11. A tension spring 13 engages the plate 9 and is dimensioned in such a manner that the pressure bars 12 and 12' are at a small spacing above the welding bars. (In FIGURE 1, the plate 9 is drawn in the position wherein it is pivoted upwardly, for clarifying the illustration.) On the underside of the table 8, an electromagnet 14 is suspended, the displaceable armature of which is connected, by way of a draw rod 15 (shown interrupted), with the freely pivotable side of plate 9. An actuating probing pin 16 with a cam lug is disposed on the pivotable side of the plate 9, which pin, when the plate 9 is pivoted into the downward position, actuates an electrical switch 17 provided on the table 8.

After the table 8, the two mirror image belt conveyors 2 and 2' are disposed at a spacing corresponding to the width of the films 6 and 6', which belt conveyors are arranged horizontally and in parallel to each other. Each of these belt conveyors 2 and 2', respectively, consists of two endless elastic conveyor belts 18 and 18'. The two conveyor belts 18 and 18' exhibit serrated ribs on their outer surfaces and are guided in the proximity of the table 8 over two drive rolls 19 and 19' of equal diameter, which rolls are provided with axial grooves corresponding to the serrated ribs to povide an interengaging toothed positive drive. The axes of the drive rolls 19 and 19' are all within a vertical plane with horizontally extending axes. The conveying parts of the conveyor belts 18 and 18' leading away from the table are guided in parallel, and their smooth inner surfaces contact each other. The conveyor belts 18 and 18' at the end travel over deflection rolls 20 and 20' with vertically positioned axes and are then guided back to the drive rolls 19 and 19' in a conventional manner (not shown). At approximately the center of the conveying parts of the conveyor belts 18 and 18', a hollow filling cylinder 21 of elliptical cross section and a vertical axis is provided between the conveyor belts. Both conveyor belts 18 and 18' are guided, by means of front guide rolls 22 and 22' and rear guide rolls 23 and 23' arranged in pairs, around the filling cylinder 21 in such a manner that the smooth inner surfaces of the conveyor belts glide along past the outer surface of the filling cylinder 21 and laterally contact the filling cylinder. The outer surface of the filling cylinder is preferably hard chrome-plated. The rotational axes of all guide rolls are vertical, and the conveying parts of the conveyor belts 18 and 18' are guided away from the drive rolls 19 and 19' so that they are twisted up to the front guide rolls 22 and 22' by an angle of 90°. This twisting is conducted in such a manner that the inner edge of the conveyor belts 18 and 18' facing in each case the opposite belt conveyor 2 and 2', respectively, is guided approximately horizontally and straight, and the outer edge is swung upwardly.

Behind the deflection rolls 20 and 20', a reel-up drum 24 is arranged at each of the two belt conveyors 2 and 2' and is driven by a slipping clutch (not shown). The circumferential velocity of these reel-up drums 24, provided with a longitudinal slot 24', is larger than the velocity of the conveyor belts 18 and 18.

Beneath the belt conveyors 2 and 2', in the region between the rear guide rolls 23 and 23' and the deflection rolls 20 and 20', the two cutting devices 4 and 4' are provided. Each cutting device consists of a horizontally arranged welding bar 25; along the front edge 26 of this bar, an electrical heating wire is disposed. The front edge 26 is provided slightly behind the plane of the outer conveyor belt 18. Oppositely the welding bar 25, a pressure bar 28 is attached to a pivot arm 27 to be horizontally pivotable. An electromagnet 29 is disposed in opposition to the end of the pivot arm 27.

Underneath the table 8, the drive assembly 3 is disposed, consisting of an electric motor 30, a magnetic clutch 31, a magnetic brake 32, and a miter gear 33. The miter gear 33 drives a bipartite horizontal drive shaft 34 to whose ends chain wheels 35 and 35' are attached. The rear portion of the drive shaft 34 carries a cam disk 36, the cam 37 of which actuates a switch 38. The belt conveyors 2 and 2' are driven by means of two sprocket chains 39 and 39'. For this purpose, an upper chain wheel 41, a gear 42, as well as the drive roll 19 are disposed on a secondary shaft 40; the upper drive roll 19' is driven by way of another gear 43.

A broad conveyor cloth 44 is disposed beneath the cutting devices 4 and 4', which cloth is wound about a drive cylinder 45.

The apparatus functions as follows: The two films 6 and 6' are guided through the slot between the guide rolls 7 and 7', pulled over the table 8, and manually inserted with their marginal strips 46 and 46' between the conveyor belts 18 and 18'. In order to ensure a secure guidance of the two films across the table, the drive rolls 19 and 19' can be disposed between the guide rolls 7 and 7' and the table 8, and the head sections of the belt conveyors 2 and 2' can be positioned on both sides of table 8.

In order to operate the apparatus, the magnetic clutch 31 is turned on, and the running electric motor 30 initiates the operation of the two belt conveyors 2 and 2' by way of the miter gear 33, the drive shaft 34, the chain wheels 35 and 35', the sprocket chains 39 and 39', and the auxiliary shafts 40. The conveying sections of the conveyor belts 18 and 18' entrain the superimposed films 6 and 6' in the direction toward the filling cylinder 21. Upon the actuation of the magnetic clutch 31, a settable time switch commences operation. After one rotation of the drive shaft 34, the cam 37 actuates the switch 38, whereby the magnetic clutch 31 is made inoperative and the magnetic brake 32 is transitorily switched on, so that the two belt conveyors 2 and 2' are instantly braked and arrested. Thus, one operating step corresponds to one rotation of the drive shaft 34, within which step the two films 6 and 6' are advanced by a predetermined distance. After the operating step is terminated, the electromagnet 14 pivoting the plate 9 downwardly and simultaneously the electromagnets 29 pivoting the pressure bars 28 are switched on; the electromagnets 14 and 29 attract and press the pressure bars 28 of the cutting devices 4 and 4' against the opposite welding bars 10 and 10', as well as 25, respectively, the electrical heating wires of which are heated. By means of the heating wires, the films 6 and 6' which contact each other and are superimposed are welded together at their edges and are simultaneously separated in the center of the welding seams. An adjustable timing relay effects an interruption of the current supply to the electromagnets 14 and 29, as soon as the welding and severing procedures are terminated. After about 10 seconds, the time switch ends its operation and switches the magnetic clutch 31 on again, so that further operating steps with the above-recited details are repeated.

Figure 2:
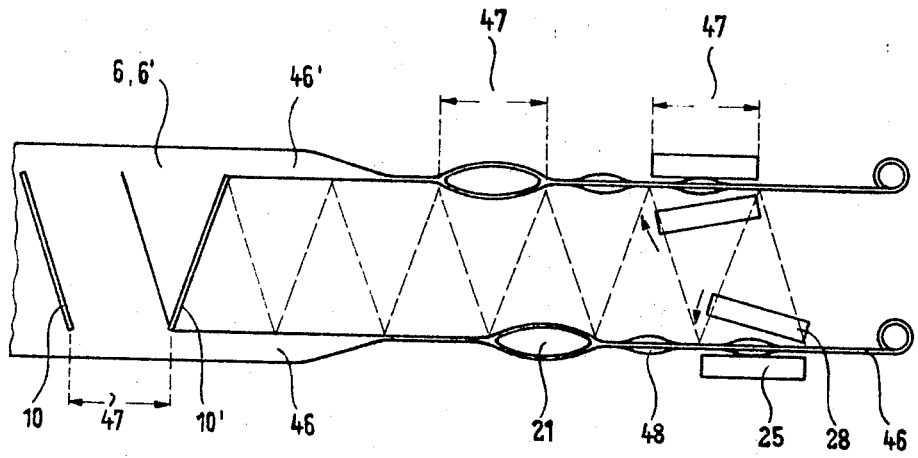
FIGURE 2 illustrates the apparatus in a top view in an extremely simplified schematic representation.

The two welding bars 10 and 10' are attached to the table 8 in such a manner that their front faces are in planes in parallel with the edges of the films 6 and 6', and are spaced equal distances from the edges. The spacing 47 of the front surfaces of the welding bars 10 and 10' is twice as large as the spacing of the rear faces. The device is adjusted so that the two films 6 and 6' are advanced during one operation step by the two belt conveyors 2 and 2' just to such an extent as corresponds to the spacing 47, which latter can be selected at will within certain limits by re-mounting the welding bars. The length of the welding bars 25 of the cutting devices 4 and 4', as well as the longitudinal extension of the filling cylinders 21 likewise correspond to this spacing 47, and the distance of the filling cylinders 21, as well as the spacings of the welding bars 25 of the cutting devices 4 and 4' from the ends of the rear welding bar 10' of the table 8 amount to an integral multiple of this spacing 47. (FIGURE 2 serves for explaining this feature.) The spacing 47 can be varied for the manufacture of bags 48 having different dimensions. This entails the re-assembly of the device corresponding to the above.

Bags having a U-shaped side profile can also be produced by means of this apparatus. For this purpose, it is merely necessary to mount two additional welding bars on the table 8, and the pressure bars pertaining thereto on the plate 9. The length of these additional welding bars corresponds to the spacing 47, and the bars are positioned in such a manner that they are arranged in planes provided by the front and rear faces of the welding bars 10 and 10' and in parallel to the edges of the films 6 and 6', as well as at a corresponding spacing from the welding bar 10'.

After the first two operating steps are executed, two separate bands of film, each similar to a saw blade, exit from the welding unit 1 in the course of the subsequent operating steps; each film band has a number of V-shaped bags 48 cohering by way of marginal strips 46 and 46'. After leaving the welding device 1, the bags 48 are suspended vertically downwardly due to their own inherent weight. The marginal strips 46 and 46' are guided between the inner surfaces of the conveying parts of the conveyor belts 18 and 18'; they are twisted with respect to each other by an angle of 90° by means of the conveyor belts and are positioned in a vertical orientation in the transverse direction in the zone of the front guide rolls 22 and 22'. Then, by means of the filling cylinders 21 the double-layer marginal strips 46 and 46' are spread apart across the width of a bag 48; the section of the marginal strip stemming from the upper film 6 is guided, by the respective conveyor belt, past the inner side of the filling cylinder 21, and the section stemming from the lower foil 6' is guided past the outer side of the filling cylinder 21. During the inactivity of the belt conveyors 2 and 2', respectively one bag 48 is underneath the filling cylinders 21, so that from above a bouquet 49 of cut flowers can be pushed through the filling cylinder into the opened bag.

During the course of the subsequent operating step, the filled bags 48 are closed behind the filling cylinders 21 by the conveyor belts 18 and 18'.

During the subsequent operating step, the filled bags 48 enter the operating range of the cutting devices 4 and 4'. At that point, the two marginal strips 46 and 46' are welded together by means of the welding bars 25 along the base lines of the bags 48, and simultaneously the welding seams are cut apart by the electrical heating wires. Thereby, the filled and weld-sealed bags fall downwardly onto the conveyor cloth 44 which carries them away.

The two marginal strips 46 and 46' leave the conveyor belts 18 and 18' behind the deflecting rolls 20 and 20'.

In order not to interfere with the proper operation of the device, these marginal strips are reeled upon the take-up drums 24. These drums are provided with a longitudinal slot 24' into which the front ends of the marginal strips are inserted.

In the process of this invention (see FIGURE 3), two thermoplastic heat-sealable films 6 and 6' of equal widths are reeled off in successive operating steps of equal length from two rolls and combined in such a manner that they are superimposed along a section of their extension in a horizontal plane. The two films are moved along stepwise across this section; between the operating steps, a rest period is provided within which there is no advancement. The films are very thin and consist of a transparent synthetic material, for example of polypropylene. In the zone of the above-mentioned section of their extension, the foils are welded together during the rest period in their center at right angles to the advancing direction and with two equally wide marginal strips 46 and 46' being left untouched, the welding taking the form of two welding seams positioned in a V-arrangement with respect to each other. In this connection, the connecting paths of the terminal points of the two welding seams are in parallel to the edges of the films and to the direction of advancement. During welding, the two welding seams are simultaneously cut apart in the center in such a manner that the two superimposed films remain connected with each other. After welding and severing, the films are moved on by one operating step; thereafter, the next welding process takes place, and so on. The magnitude of one operating step corresponds to the connecting distances of the terminal points of the two welding seams. By the successive welding and cutting steps conducted on the advanced films, separate double-layered film bands are obtained exhibiting each a number of V-shaped bags 48. These film bands are seized at the marginal strips 46 and 46' and advanced stepwise. In order to sever the two foil bands completely, they can be somewhat pulled apart in the transverse direction. The marginal strips first have a horizontal position, and the bags 48 are suspended vertically downwardly on account of their own weight. Now, the marginal strips are turned or twisted with respect to each other by respectively an angle of 90°. This twisting procedure is conducted so that the adjacent connecting paths of the terminal points of the welding seams of each of the two film bands remain situated in a horizontal straight line, and the edges of the film bands are pivoted upwardly.

In order to fit cut flowers into the bags, the double-layered marginal strips are then spread apart approximately across the width of a bag. By this spreading action, the bags are opened at their widest point so that, during the rest period, the cut flowers can be inserted from above into the respective, opened bag. During the further movement, the two marginal strips, after the filling of the bag, are again combined and thereby the bags are closed one after the other. Finally, the film bands, within the rest period, are welded together in each case along the connecting paths of the terminal points of the welding seams, and simultaneously these welding seams are severed in such a manner that the bags, sealed by the welding step, are separated from the film bands and fall away. The two marginal strips are finally wound up.

The invention meets the need for a packaging method suitable for cut flowers and potted plants. The process makes it possible to envelop gently the sensitive plants and yields moisture-proof transparent packages in the form of V-shaped or U-shaped bags, the configuration and size of which can be adapted to the goods to be packaged. The packaging material is utilized except for the narrow marginal strips. With the aid of the proposed apparatus, for whose operation solely two unskilled operators are necessary, up to 1,000 and more individual cut flowers or potted plants or bouquets can be packaged each hour to be ready for sale; this represents a considerable saving in time and personnel as compared to the conventional packaging which was previously conducted exclusively by hand. Errors in packaging are avoided, since the weld-sealing and severing of the bags can only take place when the goods to be packaged are correctly placed into the bag. The device is uncomplicated and thus can be produced inexpensively. Likewise, the device can be readily adapted to operating requirements by varying the chronological succession of the successive operating steps; optionally, when correspondingly long rest periods are provided between the operating steps, it can be handled by a single person.

By means of the process suggested by this invention and the apparatus conceived for conducting the process, it is possible to package, instead of cut flowers or potted plants, also bulk goods of any kind just as well, for example foodstuffs, such as rice, articles made from dough, sugar, and other goods, advantageously into bags. For this purpose, the bulk goods are conducted into the filling cylinders by means of blockable pipelines or chutes, the blocking elements of the piplines being controlled by the drive assembly of the apparatus of this invention.

The above embodiments have been shown and described only as examples of the present invention; other modifications and embodiments according to the broad aspects of the invention are contemplated within the spirit and scope of the present invention as defined by the following claims.

I claim:

1. Process for packaging materials into bags of thermoplastic films of a synthetic material, wherein the bags are manufactured from two equally wide superimposed films, including the steps of welding seams in the films forming alternate oppositely edge opening bags; severing the sheets along the welded seams only inwardly spaced from the marginal edges to form two equally wide separate marginal strips each having a continuous number of bags commencing at the marginal strips and being in connnection with one another by way of these marginal strips; opening the bags by spreading apart the films at the marginal strips and inserting the material to be packaged into the bags; welding seams in the films of each marginal strip to seal each bag and thereafter severing each sealed bag from the corresponding marginal strip.

2. The process of claim 1 for successive manufacture, wherein the films are advanced stepwise in operating steps interrupted by rest periods to extend horizontally; all of said welding being only inwardly spaced from the marginal edges of said films; the welding steps being performed only during the rest periods and the films being advanced a distance equal to the distance between bags along one marginal strip; twisting the separate marginal strips 90° so that their corresponding bags hang vertically therefrom.

3. The process according to claim 2, including the step of reeling up the marginal strips after the sealed bags have been severed therefrom.

4. Apparatus for the packaging of cut flowers, potted plants, and other materials into bags of thermoplastic films of a synthetic material, comprising: a welding unit with welding bars mounted on a table; means horizontally guiding the films over said table; pressure bars pivotably disposed above the table for cooperation with said welding bars; two belt conveyor means serving for the stepwise advancement of the films and each having two endless conveyor belts driven by respectively two drive rolls arranged in pairs in a side-by-side arrangement for receiving therebetween the films; and a cutting device with two welding bars and two cooperating pressure bars pertaining thereto; said welding bars being inwardly spaced from both side margins of the films guided across the table; said belt conveyor means being positioned horizontally in side-by-side arrangement, their mutual spacing corresponding to the width of the films; said belt conveyor means engaging the marginal strips of the films in the zone of the table; the conveyor belts consisting of an elastic material; the drive rolls being closely adjacent the table and their axes being horizontal and positioned vertically one above the other;

the conveyor belts leading away from the table approximately in parallel, and in contact each other with their inner faces; said conveyor belts being twisted behind the drive rolls by an angle of 90°; one hollow filling cylinder being provided between the conveying parts of the conveyor belts, respectively, and having a vertical axis; front guide rolls and rear guide rolls respectively in front of and behind each filling cylinder arranged in pairs, the axes of which are disposed vertically with the conveying parts moving in between the rolls; said rolls guiding the conveyor belts entraining the marginal strips of the films with their inner surfaces on both sides around the filling cylinder; and the welding bars of the cutting device being positioned behind the rear guide rolls in a horizontal extension and at a small spacing beneath the conveying parts of the conveyor belts and the cooperating pressure bars being horizontally pivotable.

5. Apparatus according to claim 4, including a vertically positioned reel-up drum arranged behind each belt conveyor; a slipping clutch driving each drum.

6. Apparatus according to claim 5, wherein the conveyor belts are provided with serrated ribs on their outer surfaces, and the drive rolls are equipped with axial grooves corresponding to the serrated ribs for a positive interengaged toothed drive.

7. Apparatus according to claim 6, wherein each filling cylinder has an elliptical cross section.

8. Apparatus according to claim 7, wherein the outer surface of each filling cylinder is hard crome-plated.

9. Apparatus according to claim 7, wherein the outer surface of each filling cylinder is provided with a coating of silicone rubber.

10. Apparatus according to claim 9, including a conveyor cloth provided underneath the cutting devices.

11. Apparatus according to claim 10, wherein the front guide rolls and the rear guide rolls are horizontally pivotable, and are pressed against each other in pairs by spring means.

12. Apparatus according to claim 11, wherein the spacing of the conveying parts of the conveyor belts of the two belt conveyor means slightly increases behind the drive rolls in the direction toward the front guide rolls.

13. Apparatus according to claim 4, wherein the conveyor belts are provided with serrated ribs on their outer surfaces, and the drive rolls are equipped with axial grooves corresponding to the serrated ribs for a positive interengaged toothed drive.

14. Apparatus according to claim 4, wherein each filling cylinder has an elliptical cross section.

15. Apparatus according to claim 4, wherein the outer surface of each filling cylinder is hard crome-plated.

16. Apparatus according to claim 4, wherein the outer surface of each filling cylinder is provided with a coating of silicone rubber.

17. Apparatus according to claim 4, including a conveyor cloth provided underneath the cutting devices.

18. Apparatus according to claim 4, wherein the front guide rolls and the rear guide rolls are horizontally pivotable, and are pressed against each other in pairs by spring means.

19. Apparatus according to claim 4, wherein the spacing of the conveying parts of the conveyor belts of the two belt conveyor means slightly increases behind the drive rolls in the direction toward the front guide rolls.

20. Apparatus for packaging materials in bags of thermoplastic films of synthetic material, comprising: first means feeding two superimposed elongated films of thermoplastic along a longitudinal path parallel to their side marginal longitudinal edges; second means adjacent said path automatically welding seams in said films forming longitudinally aligned alternately marginal side opening bags and severing the films along the welded seams only inwardly spaced a substantial distance from the marginal edges to form two equally wide separate marginal strips, each marginal strip being integral with the corresponding alternate bags; third means automatically separating the films of each marginal strips sequentially opposite each bag to form a filling opening; fourth means seam welding shut each bag on each marginal strip and thereafter severing each shut bag from its associated marginal strip; and conveyor means for engaging each marginal strip and automatically moving said marginal strips sequentially from said second means past said third and fourth means.

References Cited

UNITED STATES PATENTS 2,612,738   10/1952   Salfisberg _____ 53—29
3,000,152   9/1961    Downie _____ 53—29 X TRAVIS S. McGEHEE, *Primary Examiner.*

U.S. Cl. X.R.

53—187